United States Patent
Thubert et al.

(10) Patent No.: US 7,707,310 B2
(45) Date of Patent: Apr. 27, 2010

(54) MOBILE IP REGISTRATION SUPPORTING PORT IDENTIFICATION

(75) Inventors: Pascal Thubert, La Colle sur Loup (FR); Eric Levy-Abegnoli, Nice (FR)

(73) Assignee: Cisco Technology, Inc., San Jose, CA (US)

( * ) Notice: Subject to any disclaimer, the term of this patent is extended or adjusted under 35 U.S.C. 154(b) by 1083 days.

(21) Appl. No.: 10/301,062

(22) Filed: Nov. 20, 2002

(65) Prior Publication Data
US 2004/0098507 A1    May 20, 2004

(51) Int. Cl.
*G06F 15/16* (2006.01)
(52) U.S. Cl. .................. 709/245; 709/228; 709/229; 370/913; 455/433; 455/435.1; 455/435.3
(58) Field of Classification Search .............. 709/200, 709/201, 228, 229, 245; 370/913; 455/433, 455/435.1, 435.2, 435.3
See application file for complete search history.

(56) References Cited

U.S. PATENT DOCUMENTS

| | | | |
|---|---|---|---|
| 4,692,918 A | 9/1987 | Elliott et al. | |
| 5,016,244 A | 5/1991 | Massey et al. | |
| 5,018,133 A | 5/1991 | Tsukakoshi et al. | |
| 5,159,592 A | 10/1992 | Perkins | |

(Continued)

FOREIGN PATENT DOCUMENTS

| | | |
|---|---|---|
| EP | 1051010 A1 | 11/2000 |
| EP | 1150530 A2 | 10/2001 |
| WO | WO 02/32159 * | 4/2002 |
| WO | WO 02/32159 A2 * | 4/2002 |

OTHER PUBLICATIONS

B. Aboba, et al, "The Network Access Identifier," RFC 2486, Jan. 1999, 6 pages.

(Continued)

*Primary Examiner*—John Follansbee
*Assistant Examiner*—Dhairya A Patel
(74) *Attorney, Agent, or Firm*—Weaver Austin Villeneuve & Sampson LLP (57) ABSTRACT

Methods and apparatus for registering with a Home Agent are disclosed. The network device sends a registration request having a home address field including an IP address to a Home Agent associated with the IP address. The registration request indicates one or more ports of the network device via which data packets or server requests addressed to the IP address are to be received. The ports may be specified in a port extension to the registration request. In addition, the registration request may indicate a priority to be associated with the registration. The Home Agent updates its mobility binding table with the IP address and care-of address, as well as other information specified in the registration request, such as port and/or priority information. The Home Agent then sends a registration reply to the network device. When the registration request is not sent directly by the network device (e.g., via a collocated care-of address), the Foreign Agent updates its visitor table upon receipt of the registration reply with the Home Agent address and IP address, as well as port and/or priority information. The registration reply is then sent to the network device. In this manner, multiple registrations for a single device or user may be established according to specified port(s), thereby enabling various applications and/or devices to be prioritized.

42 Claims, 8 Drawing Sheets

U.S. PATENT DOCUMENTS

| | | | |
|---|---|---|---|
| 5,218,600 | A | 6/1993 | Schenkyr et al. |
| 5,371,852 | A | 12/1994 | Attanasio et al. |
| 5,442,633 | A | 8/1995 | Perkins et al. |
| 5,457,736 | A | 10/1995 | Cain et al. |
| 5,473,599 | A | 12/1995 | Li et al. |
| 5,572,528 | A | 11/1996 | Shuen |
| 5,659,544 | A | 8/1997 | La Porta et al. |
| 5,793,762 | A | 8/1998 | Penners et al. |
| 5,901,352 | A | 5/1999 | St-Pierre et al. |
| 6,137,791 | A | 10/2000 | Frid et al. |
| 6,144,671 | A | 11/2000 | Perinpanathan et al. |
| 6,160,804 | A | 12/2000 | Ahmed et al. |
| 6,363,081 | B1 * | 3/2002 | Gase .......................... 370/466 |
| 6,430,698 | B1 | 8/2002 | Khalil et al. ..................... 714/4 |
| 6,466,964 | B1 | 10/2002 | Leung et al. ................. 709/202 |
| 6,501,746 | B1 | 12/2002 | Leung |
| 6,640,241 | B1 * | 10/2003 | Ozzie et al. .................. 709/204 |
| 6,697,354 | B1 | 2/2004 | Borella et al. |
| 6,990,339 | B2 | 1/2006 | Turanyi et al. |
| 7,031,275 | B1 * | 4/2006 | Borella et al. ............... 370/328 |
| 7,079,499 | B1 | 7/2006 | Akhtar et al. |
| 7,251,496 | B2 | 7/2007 | Thubert et al. |
| 7,480,305 | B1 * | 1/2009 | Somasundaram ........... 370/401 |
| 2002/0080752 | A1 * | 6/2002 | Johansson et al. ........... 370/338 |
| 2002/0188562 | A1 * | 12/2002 | Igarashi et al. ................. 705/40 |
| 2003/0007475 | A1 * | 1/2003 | Tsuda et al. ................. 370/338 |
| 2003/0220945 | A1 | 11/2003 | Malik et al. |
| 2004/0015607 | A1 | 1/2004 | Bender et al. |
| 2004/0095912 | A1 * | 5/2004 | Gao et al. .................... 370/338 |
| 2005/0041650 | A1 * | 2/2005 | O'Neill ....................... 370/355 |
| 2008/0151837 | A1 | 6/2008 | Soininen et al. |

OTHER PUBLICATIONS

C. Perkins, "*IP Mobility Support for IPv4*," RFC 3220, Jan. 2002, 76 pages.

Thubert, et al, "*Mobile Director*," U.S. Appl. No. 2004/0092260 A1, filed Oct. 3, 2002, published May 13, 2004.

Thubert, et al, "*Personal IP Address*," U.S. Appl. No. 10/301,063, filed Nov. 20, 2002.

D. Oran, RFC 1142 "*OSI IS-IS Intra-domain Routing Protocol*," Feb. 1990.

J. Moy, RFC 1247 "*OSPF Version 2*," Jul. 19, 1991.

C. Perkins, RFC 2002 "*IP Mobility Support*," IBM Corporation, Oct. 1996.

D. Cong and M. Hamlen, and C. Perkins, RFC 2006 "*The Definitions of Managed Objects for IP Mobility Support using SMIv2*," Motorola and IBM Oct. 1996, pp. 1-52.

T. Li, et al., RFC 2281 "*Cisco Hot Standby Router Protocol (HSRP)*," Mar. 1998.

G. Montenegro, RFC 2344 "*Reverse Tunneling for Mobile IP*," Sun Microsystems, Inc., pp. 1-19, May 1998.

Uyless Black, "TCP/IP and Related Protocols," 1992, *McGraw-Hill, Inc.*, pp. 226-249.

"*Mobile IP* ", Release 12.0(1)T, pp. 1-56.

Release notes for 3Com Corporation, "*Conducting a Redundant Route for Network Resiliency*," Mar. 1994, *NET Builder Family Bridge/Router* pp. 26-29.

Chambless, et al., "*Home Agent Redundancy Protocol (HARP)*," Oct. 27, 1997.

D. Harkins and D. Carrel, "*The Internet Key Exchange (IKE)*," Cisco Systems, pp. 1-33, Jun. 1998.

H. Soliman, et al., Internet Draft "*Hierarchical Mobile IPv6 Mobility Management (HMIPv6)*," Dec. 2004, 28 pages.

US Office Action mailed May 15, 2006, in U.S. Appl. No. 10/301,063.

European Office Action dated Mar. 7, 2007, Application No: 03779521.8.

Internet Draft—Perkins et al, Internet Engineering Task Force, "IP Mobility Support for IPv4, revised; rfc2002-bis-06.txt" Jun. 18, 2001.

U.S. Office Action dated Jun. 6, 2008 from related U.S. Appl. No. 10/301,063.

Australian OA dated Jul. 11, 2008 from related AU Application No. 2003285197, 6 pgs.

U.S. Office Action dated May 18, 2007 from related U.S. Appl. No. 10/301,063.

U.S. Office Action dated Oct. 31, 2007 from related U.S. Appl. No. 10/301,063.

U.S. Office Action dated Dec. 23, 2008 from related U.S. Appl. No. 10/301,063, 41 pgs.

First Chinese Office Action dated Dec. 5, 2008 from CN Application No. 200380103822.2, 26 pgs.

U.S. Office Action dated May 12, 2009 from U.S. Appl. No. 10/301,063, 39 pgs.

International Search Report, Application No. PCT/US03/35956, Mailed Mar. 31, 2004; 4 pages.

US Office Action mailed Dec. 1, 2006 from U.S. Appl. No. 10/301,063.

\* cited by examiner

Registration Reply

| Home Address = Personal IP address or IP address of device | COA | NAI extension | (Opt.) Port extension | (Opt.) Priority extension |
|---|---|---|---|---|

*FIG. 7*

Mobility Binding Table

| IP Address | COA | NAI | Port | Priority | Tunnel |
|---|---|---|---|---|---|
|  |  |  |  |  |  |
|  |  |  |  |  |  |
|  |  |  |  |  |  |
|  |  |  |  |  |  |

*FIG. 8*

Visitor Table

| IP Address | Home Agent | NAI | Port | Priority | Tunnel |
|---|---|---|---|---|---|
|  |  |  |  |  |  |
|  |  |  |  |  |  |
|  |  |  |  |  |  |
|  |  |  |  |  |  |

MOBILE IP REGISTRATION SUPPORTING PORT IDENTIFICATION

RELATED APPLICATIONS

This application is related to U.S. patent application Ser. No. 11/301,063 entitled "Personal IP Address," by Thubert et al, filed on the same day, which is incorporated herein by reference for all purposes.

BACKGROUND OF THE INVENTION

1. Field of the Invention

The present invention relates to Mobile IP network technology. More particularly, the present invention relates to Mobile IP registration.

2. Description of the Related Art

Mobile IP is a protocol that allows laptop computers and other mobile computer units ("mobile nodes") to roam between various sub-networks while maintaining Internet and/or WAN connectivity. Without Mobile IP or similar protocols a mobile node would be unable to stay connected while roaming from one location serviced by one sub-network to another location being serviced by a different sub-network. This is because each IP address has a field that specifies the particular sub-network on which the node resides. If a user desires to take a computer that is normally attached to one network and roam so that it passes through different sub-networks, the roaming computer cannot use its home base IP address. As a result, a businessperson traveling across the country cannot travel with his or her computer across geographically disparate network segments or wireless nodes while maintaining Internet connectivity. This is not acceptable in the age of portable computational devices.

To address this problem, the Mobile IP protocol has been developed and implemented. An implementation of Mobile IP is described in RFC 3220, "IP Mobility Support for IPv4" of the Network Working Group, C. Perkins, Ed., January 2002. Mobile IP is also described in the text "Mobile IP, The Internet Unplugged" by J. Solomon, Prentice Hall, 1998. Both of these references are incorporated herein by reference in their entireties and for all purposes.

Figure 1:
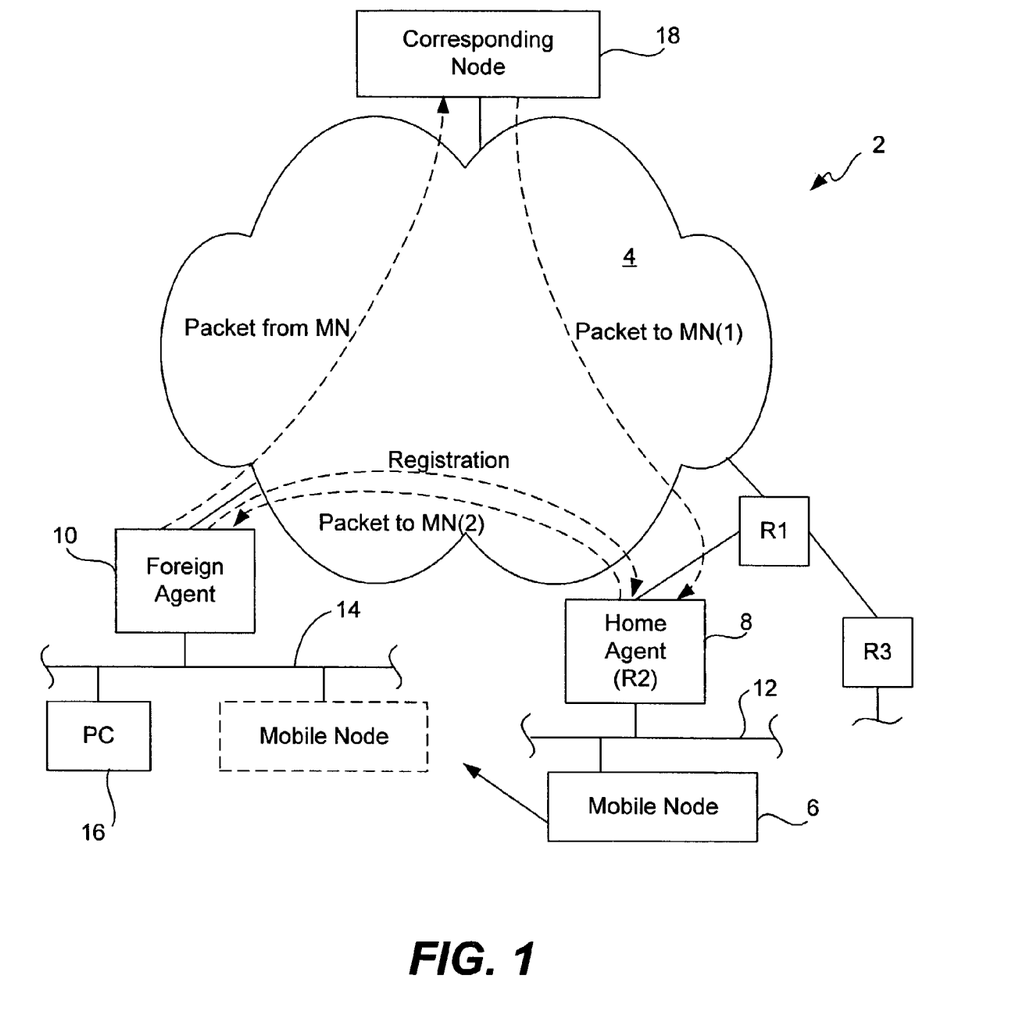
FIG. 1 is a block diagram of a Mobile IP environment.

The Mobile IP process and environment are illustrated in FIG. 1. A Mobile IP environment 100 includes the Internet (or a WAN) 105 over which a mobile node 110 can communicate via mediation by a home agent 115 or a foreign agent 120. Typically, the home agent 115 and foreign agent 120 are routers or other network connection devices performing appropriate Mobile IP functions as implemented by software, hardware, and/or firmware. Note the overall network topology is arbitrary, and elements such as the home agent 115 need not directly connect to the Internet 105. For example, the home agent 115 may be connected through another router R1 125. Router R1 125 may, in turn, connect one or more other routers R3 130 with the Internet 105.

When mobile node 110 is plugged into its home network segment 135 it connects with the Internet 105 through its designated home agent 115. When the mobile node 110 roams, it can be connected to a remote network segment 140 and communicate through the available foreign agent 120. Other nodes, such as a PC 145, on remote network segment 140 also communicate with the Internet 105 through foreign agent 120. Presumably, there are many foreign agents available at geographically disparate locations to allow wide spread Internet connection via the Mobile IP protocol.

Mobile node 110 may identify foreign agent 120 through various agent solicitations and agent advertisements that form part of the Mobile IP protocol. When mobile node 110 engages with remote network segment 140, it composes a registration request for the home agent 115 to bind the mobile node's 110 current location with its home location. Foreign agent 120 then relays the registration request 150 to home agent 115. During the registration process, the home agent 115 and the mobile node 110 may then negotiate the conditions of the mobile node's 110 attachment to foreign agent 120. For example, the mobile node 110 may request a registration lifetime of 5 hours, but the home agent 115 may grant only a 3 hour period. When the negotiation is successfully completed, home agent 115 updates an internal "mobility binding table" which links the mobile node's 110 current location via its care-of address (e.g., a co-located care-of address or the foreign agent's IP address) to the identity (e.g., home address) of the mobile node 110. Further, if the mobile node 110 registered via foreign agent 120, the foreign agent 120 updates an internal "visitor table" which specifies the mobile node address, home agent address, etc. The home agent's 115 association between a mobile node's home base IP address, its current care-of address, and the remaining lifetime of that association is referred to as a binding.

If mobile node 110 wanted to send a message to a correspondent node 155 from its new location, the mobile node 110 would forward a packetized output message 160 through the foreign agent 120 over the Internet 105 to the correspondent node 155 according to standard Internet protocols. However, if the correspondent node 155 wanted to send a message 165 to the mobile node 110—whether in reply to a message from the mobile node 110 or for any other reason—the correspondent node 155 addresses that message to the IP address of the mobile node 110 as if the mobile node 110 were on the home network segment 135. The packets of the message from the correspondent node 155 are forwarded over the Internet 105 to the router R2 125 and ultimately to the home agent 115.

From the home agent's 115 mobility binding table, the home agent 115 recognizes that the mobile node 110 is no longer attached to the home network segment 135. The home agent 115 then encapsulates the packets from correspondent node 155 (which are addressed to the mobile node 110 on the home network segment 135) according to the Mobile IP protocol, and forwards these encapsulated packets 170 to the appropriate care-of address for mobile node 110. If the care-of address is the IP address of the foreign agent 120 the foreign agent 120 strips the encapsulation and forwards the message to the mobile node 110 on the remote network segment 140. The packet forwarding mechanism implemented by the home agent 115 to the foreign agent 120 is often referred to as "tunneling."

Currently, IP addresses are intended to allow routing to a particular interface of a networked device. In order to enable communication among multiple devices, the devices are commonly connected by a network or infrastructure of networks. Access to communications in an internal network is typically restricted to users upon entering a username and password. For instance, a user typically logs into a private network such as a company network in order to read electronic mail sent to the user (e.g., Pascal@Cisco.com) via the private network. Similarly, in order to enter a videoconference within a private network, the user must first log into the private network.

In addition to logging into the private network, the user must typically initiate the application being used. For instance, in order to use a system such as a web messenger service, the user must register to a directory via a server. Thus, in order to initiate such peer-to-peer applications, the client must typically initiate the application by contacting a server.

In other words, the processing by the server is required to maintain communications between the peers. The initiation by the client via a login or other registration process is time-intensive, requiring efforts by the user, as well as requiring resources of the server to be allocated to the application. Accordingly, peer-to-peer types of applications generally require an intermediate system or server to establish such connections.

As described above, registration performed by a user is typically performed using a single Home Address. Once registered, the user receives all communications at that particular Home Address via the device associated with that Home Address. Unfortunately, when the user wishes to use another device, the registration is no longer valid, and the user must re-register via that device with a Home Address that identifies that device. Moreover, although various devices may be more desirable for different types of traffic (e.g., voice, email), the user may register only once via a single care-of address and Home Agent. As a result, traffic cannot be differentially routed to different devices used by a single user.

In view of the above, it would be beneficial if applications such as peer-to-peer applications could be accessed without requiring an intermediate server. Moreover, it would be beneficial if traffic could be routed in a manner that enables a user to communicate via different devices, as well as distinguish the types of traffic to be routed once registration is completed.

SUMMARY OF THE INVENTION

The present invention provides methods and apparatus for processing registration requests. In accordance with one aspect of the invention, methods and apparatus for registering with a Home Agent using a "personal" IP address are disclosed. First, a user logs in with his or her username via the network device to obtain an IP address, which will be associated with the username. A registration request is then composed, where the registration request comprises a home address field including the obtained personal IP address. The registration request is then sent to a Home Agent associated with the username. The registration request that is sent to the Home Agent includes a NAI identifying the username, a care-of address, and a home address field including the obtained IP address. Upon authentication of the user using the NAI, the Home Agent updates its mobility binding table to include the care-of address, the NAI, and the obtained IP address. The Home Agent then sends a registration reply to the care-of address. Upon completion of registration, data packets or server requests addressed to the username may be routed to the obtained IP address by the Home Agent. In this manner, registration that is personal to the user (rather than associated with a particular device) is established, enabling peer-to-peer communications between corresponding nodes and the Mobile Node. Communications that are sent to that user will be received by that user, regardless of the network device via which the user has registered.

In accordance with another aspect of the invention, methods and apparatus for registering a network device with a Home Agent via a set of specified ports of the network device are disclosed. The network device sends a registration request having a home address field including an IP address to a Home Agent associated with the IP address. The IP address may be an IP address that has been statically assigned to the network device or an IP address that is a personal IP address that is associated with the user (e.g., username or NAI). The registration request indicates one or more ports of the network device via which data packets or server requests addressed to the IP address are to be received. In one embodiment, the ports are specified in a port extension to the registration request. In addition, the registration request may indicate a priority to be associated with the registration, which may also be provided in an extension to the registration request. The Home Agent updates its mobility binding table with the IP address and care-of address, as well as other information specified in the registration request, such as port and/or priority information. The Home Agent then sends a registration reply to the network device. When the registration request is not sent directly by the network device (e.g., via a collocated care-of address), the Foreign Agent updates its visitor table upon receipt of the registration reply with the Home Agent address and IP address, as well as port and/or priority information. The registration reply is then sent to the network device. In this manner, multiple registrations for a single device or user may be established in accordance with the specified port(s). These registrations may be further assigned different priorities to enable various applications and/or devices to be prioritized.

In accordance with yet another aspect of the invention, upon completion of the registration process in which port and/or priority information have been specified, the Home Agent forwards packets in accordance with the ports and priority information. The packets may be data packets or server requests directed to network devices that operate as servers. Through the specification of one or more ports in a particular registration, traffic can be differentially routed to different devices. These devices may be associated with a single user (e.g., username) and therefore the same IP address, or they may be associated with different IP addresses. Moreover, through the use of a priority within a particular registration request, the priority may indicate preferences among various devices (or registrations). For instance, such priorities among multiple registrations may indicate that the registration or device is more desirable for different types of traffic (e.g., voice, email). As one example, a user may register via a cell phone using a higher priority and a laptop using a lower priority when it is anticipated that voice traffic will be transmitted. In addition, the priorities may be used for load distribution among servers that have registered as Mobile Nodes with a particular Home Agent (or pool of Home Agents).

In accordance with yet another aspect of the invention, when a Foreign Agent is implemented, the Foreign Agent updates its visitor table to enable packets to be directed to the visiting Mobile Node. Specifically, when a Mobile Node specifies a set of ports and/or priority information, the Foreign Agent updates its visitor table with this information, along with the identity of the Home Agent. Through the specification of a different set of ports in each registration, multiple registrations may be established using the same home address. As a result, the Foreign Agent stores the information in order to distinguish between these different sessions. In addition, the priority information may be used in order to ascertain which one of multiple registrations should receive a data packet or server request. The Home Agent also stores similar information in its Mobility Binding Table.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, registration request and reply packets having the format described herein and provided on appropriate media are part of this invention. As another example, visitor tables and mobility binding tables having the formats described herein are also part of this invention.

These and other features of the present invention will be described in more detail below in the detailed description of the invention and in conjunction with the following figures.

DETAILED DESCRIPTION OF THE PREFERRED EMBODIMENTS

In the following description, numerous specific details are set forth to provide a thorough understanding of the present invention. It will be obvious, however, to one skilled in the art that the present invention may be practiced without some or all of these specific details. In other instances, well known process steps have not been described in detail in order to avoid unnecessarily obscuring the present invention.

Although the Mobile Nodes are shown connected to a Foreign Agent in FIG. 1, the Mobile Nodes may also register with the Home Agent 306 without accessing a Foreign Agent. More specifically, in Internet Protocol version 4 (Ipv4), the Mobile Nodes may register via a Foreign Agent or a collocated care-of address. Similarly, the Mobile Nodes may register directly (without a Foreign Agent) or indirectly by Hierarchical Mobile IP (HMIP) Mobility Anchor Point (MAP) in Internet Protocol version 6 (Ipv6) as set forth in the Internet Draft, "Hierarchical Mobile IPv6 mobility management (HMIPv6)" submitted to the IETF Mobile IP Working Group, by Soliman, et al, published in October 2002. Thus, the present invention may be implemented in a system in which the Home Agent and the plurality of Mobile Nodes support either Ipv4 or Ipv6.

Figure 2:
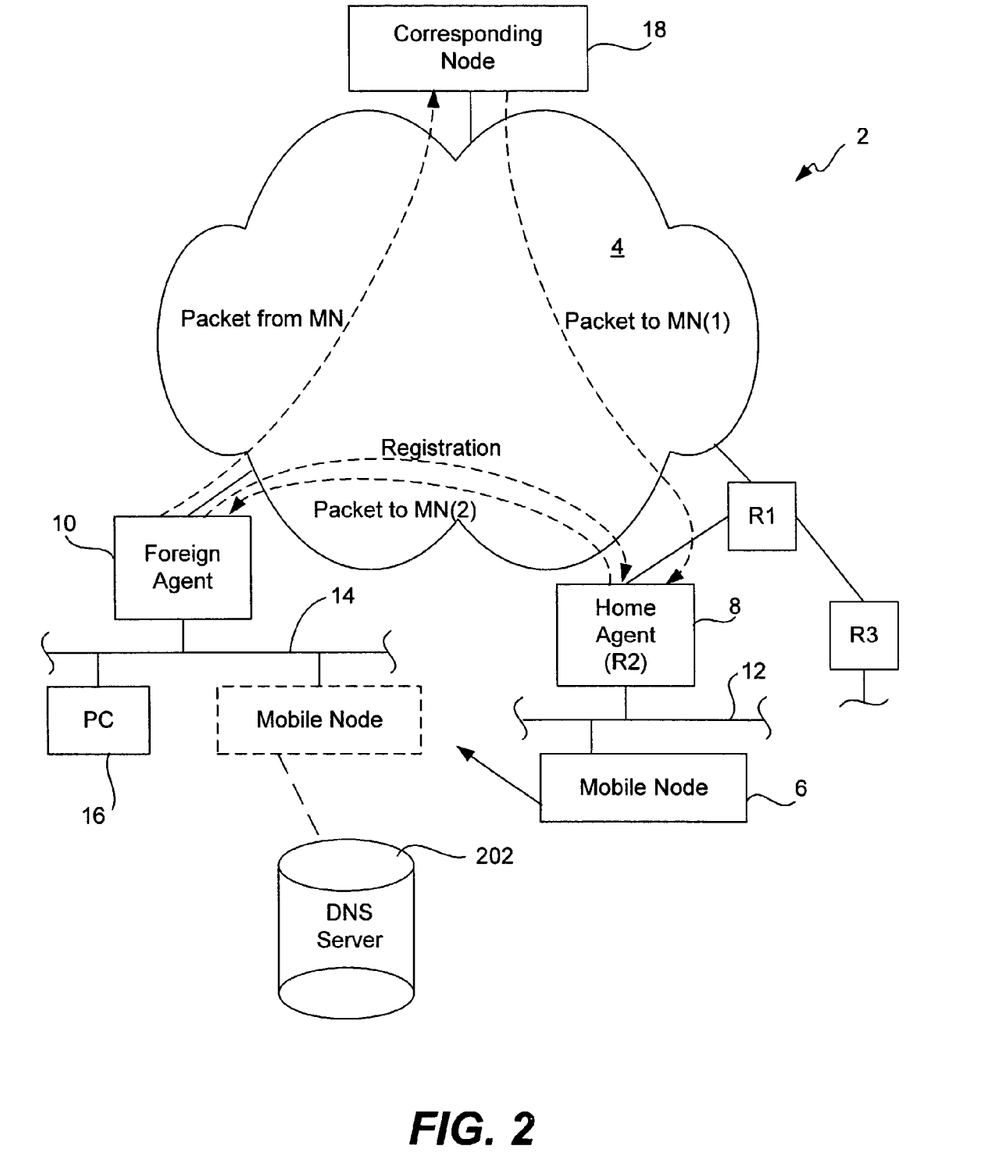
FIG. 2 is a diagram illustrating a system in which the present invention may be implemented.

In accordance with one embodiment, the present invention enables messages to be routed to any device that an individual chooses to use at a given point in time. This is accomplished, in part, through the use of a personal IP address. FIG. 2 is a diagram illustrating a system in which the present invention may be implemented. As shown, a DNS server 202 may be used to return personal IP addresses when a user logs in with his or her username and password. The user may then use this personal IP address to complete his or her mobile IP registration. Accordingly, through the use of the personal IP address that is assigned to the user, Mobile IP may route packets to the user wherever the user is logged in.

The DNS server may be directly accessed by the network device. Alternatively, the user may indicate in a registration request that the user wishes to receive a home address assignment from a Home Agent or other entity. The Home Agent may then assign a personal home address, such as via a DNS server illustrated in FIG. 2. A method of dynamically assigning a home address to a mobile node is described in further detail in patent application Ser. No. 09/227,397, entitled "Mobile IP Dynamic Home Address Resolution," by Leung, which is incorporated herein for all purposes.

Figure 3A:
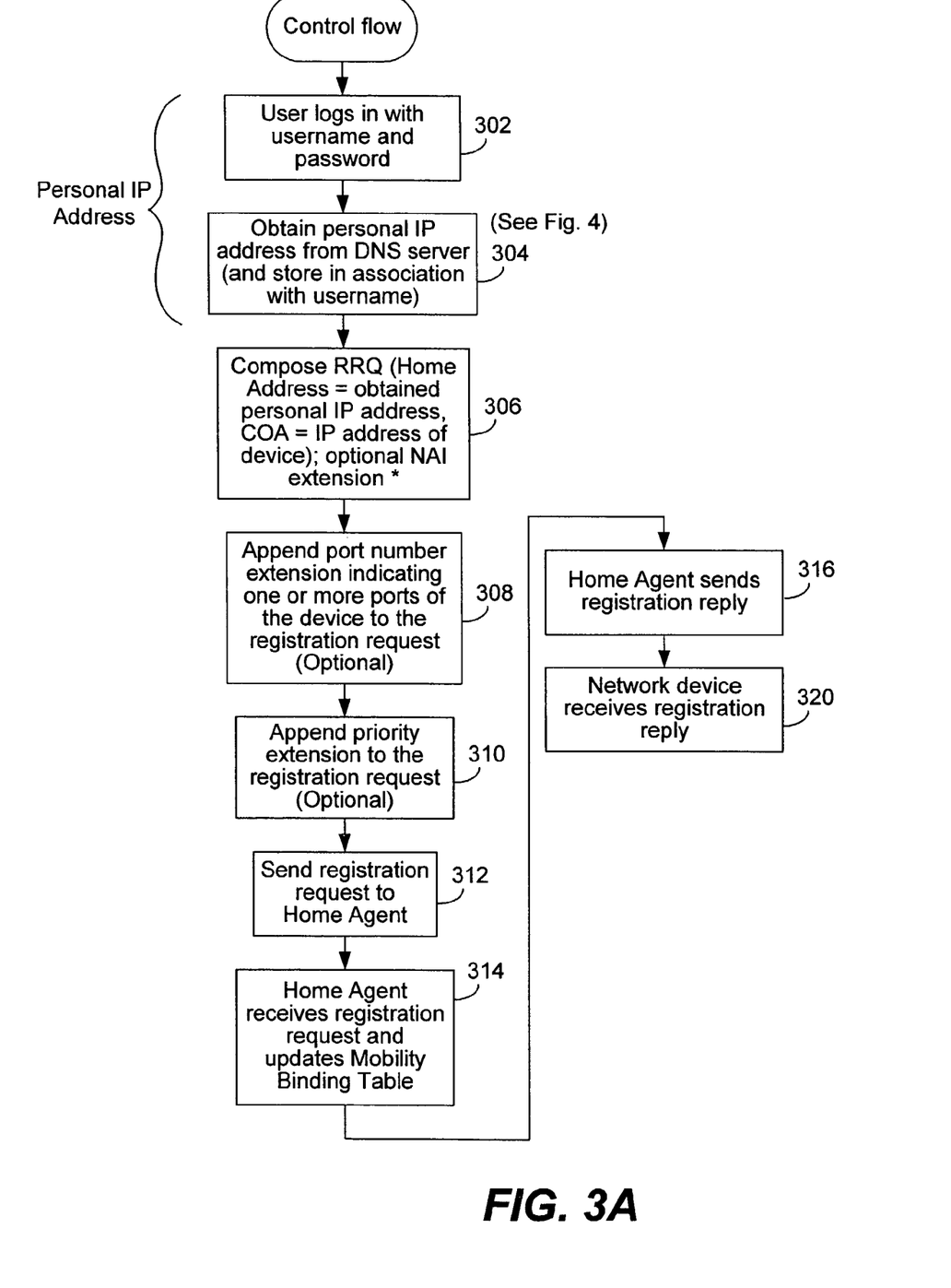
FIGS. 3A and 3B are control flow diagrams illustrating methods of processing a registration request in accordance with various embodiments of the invention.

FIG. 3A is a control flow diagram illustrating a method of processing a registration request in accordance with various embodiments of the invention. Specifically, FIG. 3A describes a method of performing registration via a collocated care-of address. This method may be performed in Ipv4 as well as Ipv6. A method of performing registration via a Foreign Agent in Ipv4 will be described in further detail below with reference to FIG. 3B. As described above, a user may complete the registration process using a personal IP address. In order to obtain this personal IP address, the user logs into his or her home network via a network device supporting Mobile IP. Specifically, as shown at block 302, the user logs into the home network by entering a username associated with the user. In addition, a password is also typically entered to enable the user's identity to be verified (e.g., authenticated) using the password and the username.

One standardized method for identifying users is proposed in RFC 2486 of the Network Working Group, January 1999, hereby incorporated by reference, which proposes syntax for the NAI, the userID submitted by a client during Point to Point Protocol (PPP) authentication. For instance, the mobile node may be configured with a NAI such as mn1@cisco.com. Thus, when a client is authenticated based upon the NAI, an IP address (i.e., Home Address) may be allocated for use by the client.

Once the network device has authenticated the user, the network device obtains a personal IP address associated with the user at block 304. Specifically, in accordance with one embodiment, the network device obtains an IP address associated with the username from a DNS server, as will be described in further detail below with reference to FIG. 4. A registration request is then composed at block 306. Specifically, the registration request includes a home address field including the obtained IP address. In addition, the registration request further includes a care-of address field including a care-of address. In accordance with various embodiments, the care-of address is an IP address associated with the network device (e.g., assigned to an interface of the network device). In addition, the registration request preferably includes a NAI extension to the registration request including the NAI (e.g., when registration is performed in Ipv4). By providing the NAI to the Home Agent, the Home Agent may map the NAI to its dynamically assigned personal IP address, enabling the Home Agent to correctly forward data packets or server requests addressed to the username to the appropriate IP address.

As described above with reference to blocks 302-306, the user may register with his or her home agent using a personal IP address. Alternatively, a user may initiate the registration process using an IP address that has been statically assigned to an interface of the device being used.

The network device may be used for any applications, including text and voice over IP communications. Thus, upon completion of the registration process, the network device may send and receive IP data packets. Moreover, the network device may be used as a network server that processes server requests. In addition, the network device acting as a server may serve as a member of a cluster of servers that register as Mobile Nodes with the Home Agent. Once the Mobile Nodes have registered with the Home Agent, server requests may be dispatched to any of the Mobile Nodes, thereby enabling a server request to be forwarded to a server capable of satisfying the request. Such a system is described in further detail in U.S. patent application Ser. No. 10/265,563 entitled "Mobile Director," by Thubert et al, filed on Oct. 3, 2002, which is incorporated herein by reference for all purposes. A network device such as a server may be dedicated to a specific application such as HTTP or SSL (Secure Sockets Layer). When a server receives communications such as web communications, those applications are typically identified with a specific port (e.g., port 80). Similarly, when the network device is used by a user to roam, rather than used as a server, the user may wish to designate specific port(s) for use during a particular session as well as by specific application(s). Thus, as shown at block 308, the user may wish to specify one or more ports in the registration request. Specifically, the registration request indicates one or more ports of the network device via which data packets or server requests addressed to the username are to be received. Of course, a default port selection mode may be provided in which all ports are specified (or specific port(s) are selected) in the event that none are selected by the user. In accordance with one embodiment, a port number extension in which the selected port(s) are specified or indicated is appended to the registration request.

The user may also wish to prioritize different registrations. Specifically, it may be more desirable to use various applications with specific devices. For instance, it may be desirable to send voice over IP transmissions via a cell phone and web communications to a laptop computer. As another example, it may be desirable to register to receive voice communications via the laptop as well, but prioritize the registrations such that the voice communications will be sent to the laptop only when the cell phone is not responding. Thus, the registration request may also indicate a priority as shown at block 310. For instance, the priority may be associated with the one or more specified ports of the network device, the priority indicating a priority with which data packets or server requests addressed to the username are to be sent to the obtained IP address (e.g., personal IP address or statically assigned IP address) at the one or more ports of the network device. The priority may be specified in an additional priority extension to the registration request.

The registration request is then sent to a Home Agent associated with the user at block 312. An exemplary registration request will be described in further detail below with reference to FIG. 6. As described above, the registration request may be sent directly, via a collocated care-of address, or via a Foreign Agent, depending upon whether Ipv4 or Ipv6 is implemented. A method of registering via a Foreign Agent will be described in further detail below with reference to FIG. 3B.

When the Home Agent receives the registration request, it authenticates the Mobile Node and updates its Mobility Binding Table at block 314. Specifically, when the Mobile Node is using a personal IP address that is dynamically assigned, the Home Agent authenticates the Mobile Node using the NAI. Of course, when the home address (e.g., personal IP address) is provided in the registration request and the message is signed with IPSec (Internet Protocol Security), a NAI need not be provided in the registration request. An exemplary Mobility Binding Table will be described in further detail below with reference to FIG. 8. The Home Agent then sends a registration reply at block 316. The network device receives the registration reply as shown at block 320, either directly or via a Foreign Agent.

Upon registration via one or more ports, the user may wish to send a subsequent registration request via the same or a different network device. The various registration requests may specify different ports as well as different priorities. In this manner, the user may prioritize different applications for use with different devices.

Figure 3B:
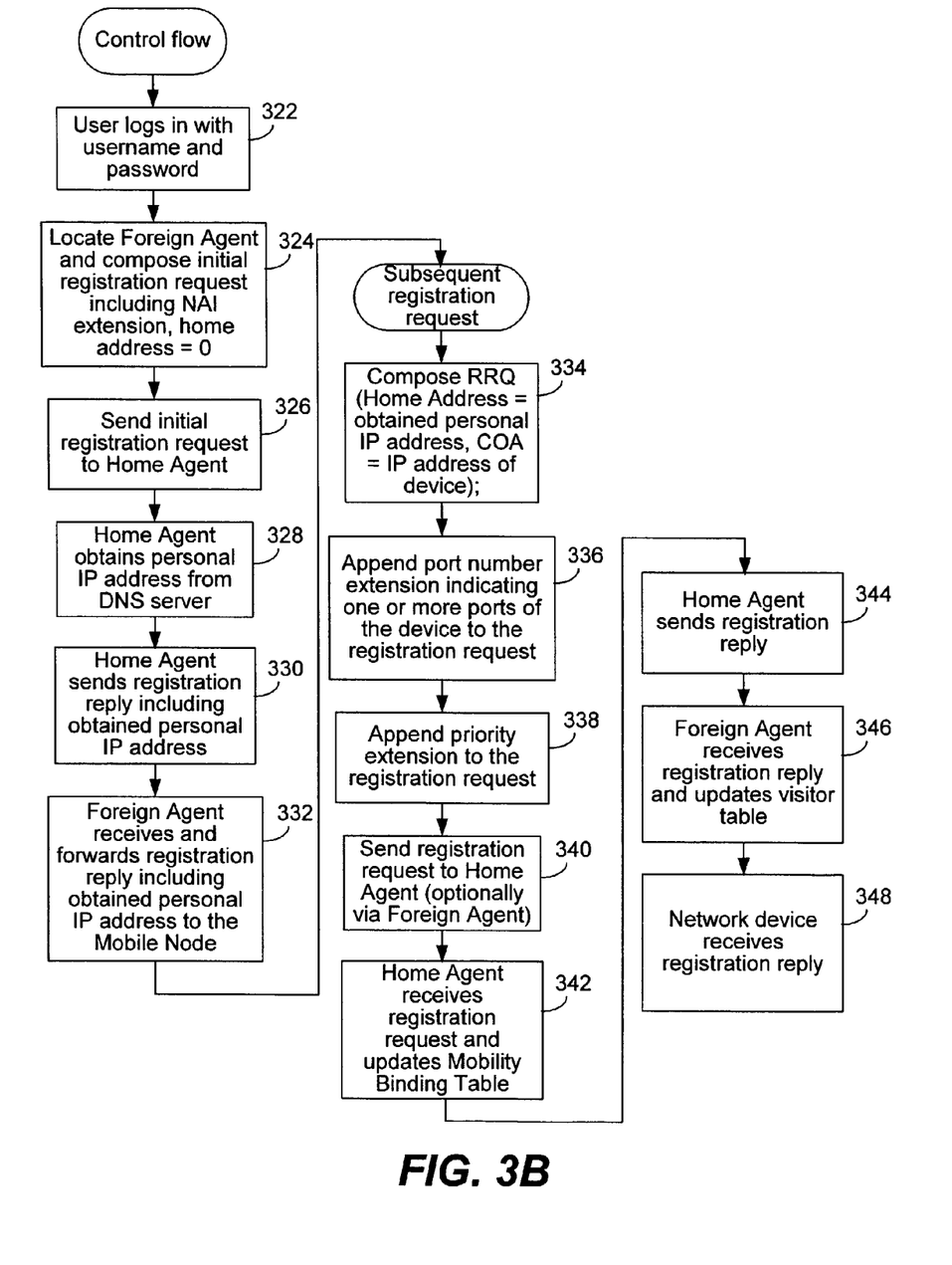

FIG. 3B is a process flow diagram illustrating a method of performing registration via a Foreign Agent in Ipv4. The user logs in with a username and password at block 322, as described above. A registration request is then composed and sent to a Foreign Agent at block 324. For instance, the Foreign Agent may be located via an agent advertisement received from the Foreign Agent. The registration request preferably includes a NAI extension including the NAI and a home address field having a value equal to 0 indicating a request for home address assignment. This initial registration request is sent to the Home Agent at 326 via the Foreign Agent. An additional extension may also be added indicating a request for personal IP address assignment in connection with the NAI.

Upon receiving the registration request, the Home Agent obtains a personal IP address (e.g., via a DNS server) associated with the NAI at block 328. The Home Agent then sends a registration reply including the obtained personal IP address at block 330. The registration reply may indicate that the Mobile Node is to re-register with the obtained IP address. The Foreign Agent receives and forwards the registration reply including the obtained personal IP address to the Mobile Node at block 332.

In a subsequent registration request, the Mobile Node composes a registration request including the obtained home address (e.g., personal IP address) and a care-of address (e.g., the Foreign Agent address) at block 334. As described above with reference to FIG. 3A, an optional port number extension and optional priority extension may be appended at blocks 336 and 338. The registration request is then sent to the Home Agent (e.g., via the Foreign Agent) at block 340. The Home Agent receives the registration request and updates its Mobility Binding Table at block 342.

The Home Agent composes and sends a registration reply at block 344. The Foreign Agent receives the registration reply at block 346 and updates its visitor table. An exemplary visitor table will be described in further detail below with reference to FIG. 9. The network device receives the registration reply at block 348.

In the embodiments described above with reference to FIG. 3B, a personal IP address is obtained via the Home Agent. However, it is important to note that registration may also be performed via a statically obtained IP address. Therefore, the steps 322 through 332 need only be performed when registration is performed via a personal IP address. The process would then be performed as described above with reference to blocks 334 through 348.

Figure 4:
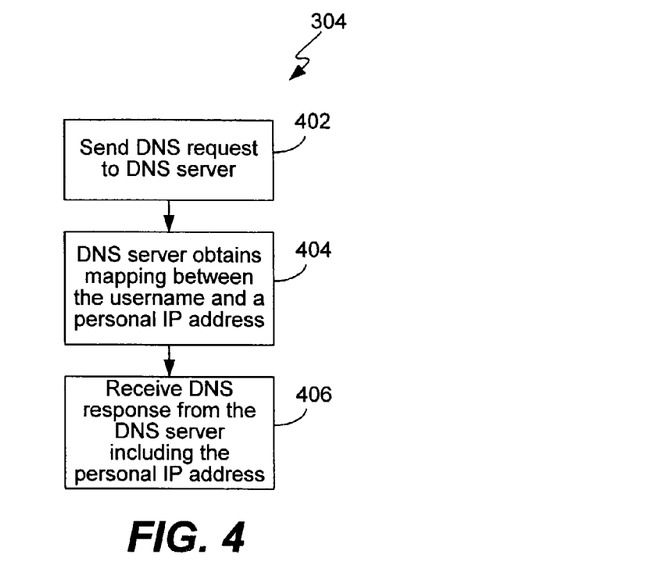
FIG. 4 is a process flow diagram illustrating a method of obtaining a personal IP address from a DNS server as shown at block 304 of FIG. 3.

FIG. 4 is a process flow diagram illustrating a method of obtaining a personal IP address from a DNS server as shown at block 304 of FIG. 3. As shown at block 402, a DNS request including the username is sent to a DNS server. The DNS server translates the username by obtaining a mapping between the username and a personal IP address at block 404. The DNS server then sends the DNS response including the personal IP address at block 406.

Figure 5:
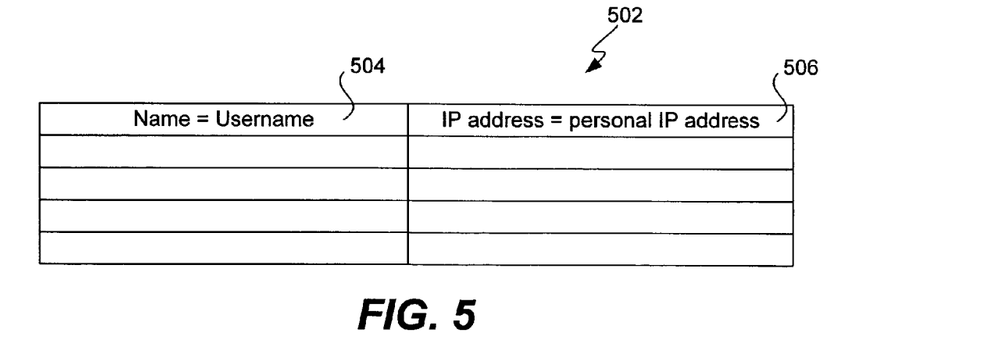
FIG. 5 is a diagram illustrating a table used by a DNS server to map individual usernames to personal IP addresses in accordance with various embodiments of the invention.

FIG. 5 is a diagram illustrating a table used by a DNS server to map individual usernames to personal IP addresses in accordance with various embodiments of the invention as described above with reference to FIG. 4. Specifically, when the DNS server receives the DNS request, it resolves the username via a mapping table 502. The DNS server obtains a mapping between the username 504 and a personal IP address 506. The DNS server then provides the personal IP address in a DNS response as described above.

Figure 6:
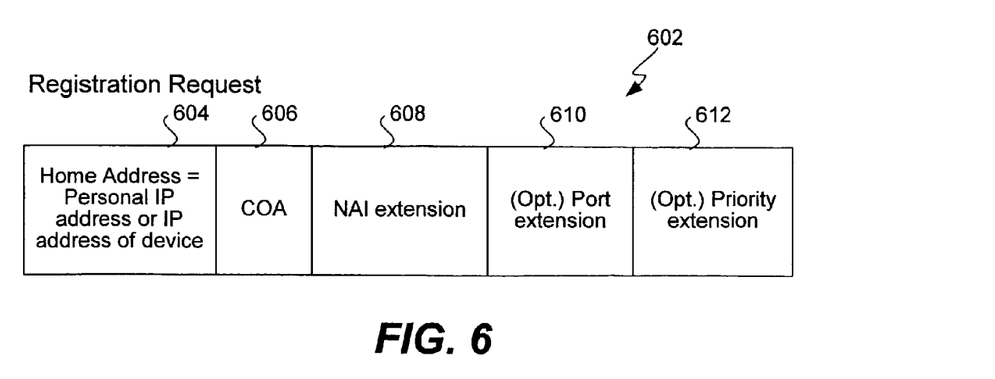
FIG. 6 is a diagram illustrating an exemplary registration request that is sent in accordance with various embodiments of the invention.

FIG. 6 is a diagram illustrating an exemplary registration request that is sent in accordance with various embodiments of the invention. The Registration request 602 includes a Home Address field 604 that includes the home address (e.g., personal IP address or statically assigned IP address). In addition, the registration request 602 includes a care-of address field 606 that specifies a care-of address, which may specify a foreign agent as well as a collocated care-of address or interface address. When an address is to be dynamically assigned by the Home Agent, the NAI may be transmitted in the registration request. Thus, a NAI extension 608 including the NAI may be appended to the registration request 602 to enable the Home Agent to assign a home address to the mobile node. As described above with reference to FIG. 3, the registration request may transmit port information as well as priority information. Thus, the registration request 602 may optionally include a port number extension 610 indicating one or more ports of the network device via which data packets or server requests addressed to the home address (or associated username) are to be received. Similarly, the registration request 602 may optionally include a priority extension 612 indicating a priority of the registration, and therefore the priority may serve to prioritize a registration associated with one or more ports of the network device.

Figure 7:
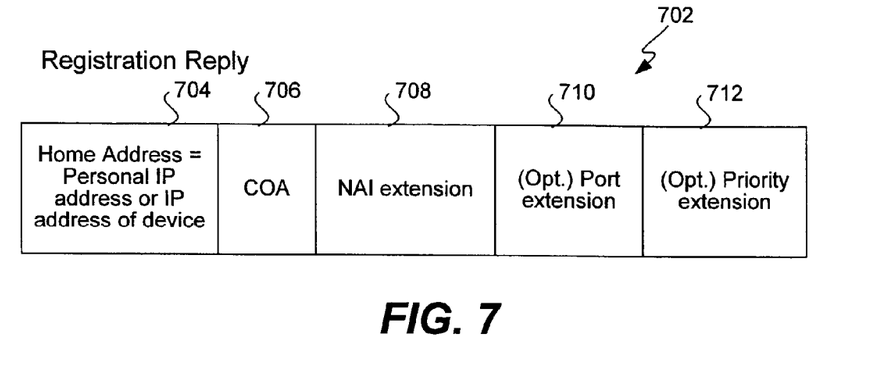
FIG. 7 is a diagram illustrating an exemplary registration reply that is sent in accordance with various embodiments of the invention.

FIG. 7 is a diagram illustrating an exemplary registration reply that is sent in accordance with various embodiments of the invention. The registration indicates success or failure of registration of the user with the Home Agent. When the registration reply indicates success of the registration of the IP address with the Home Agent, the user can subsequently receive packets addressed to the IP address (e.g., username).

As shown, the registration reply 702 includes a Home Address field 704 that includes the home address (e.g., personal IP address or statically assigned IP address). In addition, the registration reply 702 includes a care-of address field 706 that specifies a care-of address, which may specify a foreign agent as well as a collocated care-of address. When an address is to be dynamically assigned by the Home Agent, the NAI may be transmitted in the registration reply. In addition, the registration reply may include priority as well as port information. Thus, the registration reply 702 may optionally include a port number extension 710 indicating one or more ports of the network device via which data packets or server requests addressed to the username are to be received via the IP address. Similarly, the registration request 702 may optionally include a priority extension 712 indicating a priority of the registration, and therefore the priority may serve to prioritize a registration associated with one or more ports of the network device. Accordingly, the registration reply may be used to confirm the details (e.g., port and priority settings) of the registration as requested in the registration reply.

Figure 8:
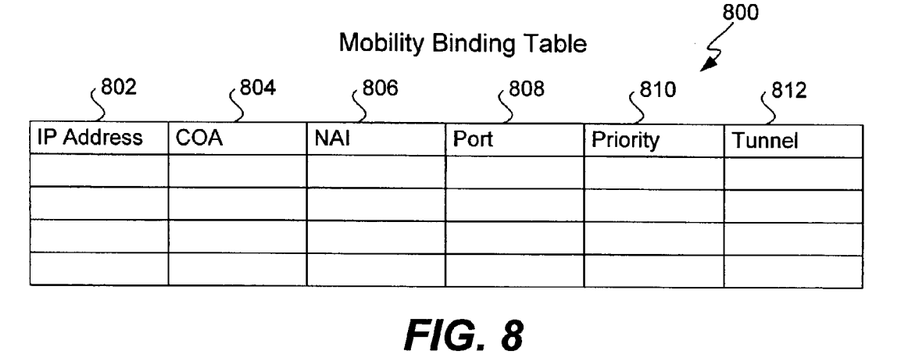
FIG. 8 is a diagram illustrating an exemplary Mobility Binding Table that is maintained by a Home Agent in accordance with various embodiments of the invention.

As described above with reference to block 314, the Home Agent updates its Mobility Binding Table with information for that registration. FIG. 8 is a diagram illustrating an exemplary Mobility Binding Table that is maintained by a Home Agent in accordance with various embodiments of the invention. Specifically, the Mobility Binding Table 800 includes a plurality of entries 801 associated with the home address 802. Moreover, each entry includes a care-of address 804, and an optional NAI 806 for those home addresses that have been dynamically assigned. Specifically, the NAI 806 is stored in order to maintain a mapping between the NAI and the leased home address. In addition, each of the entries may indicate a different set of one or more ports 808 of the network device, as well as a priority 810 obtained from the registration request packet. As shown, each entry of the mobility binding table identifies a tunnel 812 via which to send packets (e.g., data packets or server requests) to the IP address. It is important to note that since a different set of ports may be designated in association with each registration, multiple registrations are possible for the same IP address. As a result, there may be more than one tunnel for a given IP address, and therefore more than one entry in the Mobility Binding Table for a given IP address.

Figure 9:
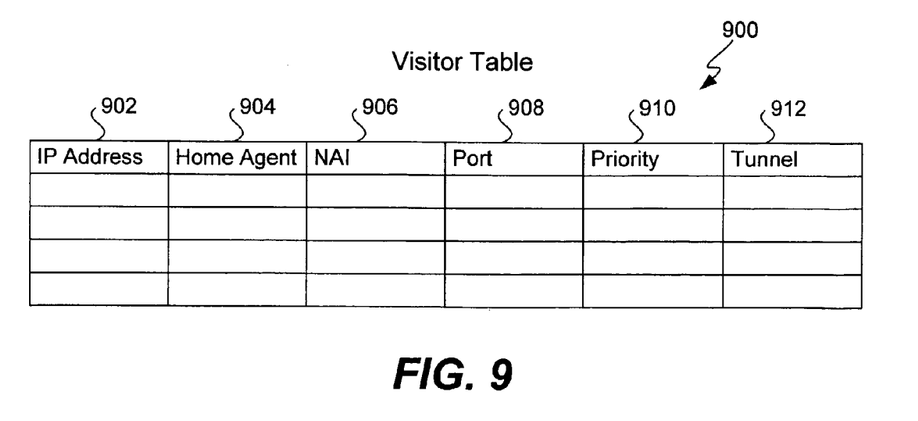
FIG. 9 is a diagram illustrating an exemplary Visitor Table that is maintained by a Foreign Agent in accordance with various embodiments of the invention.

FIG. 9 is a diagram illustrating an exemplary Visitor Table that is maintained by a Foreign Agent in accordance with various embodiments of the invention. Specifically, the Visitor Table 900 includes a plurality of entries 901 associated with the home address 902. Moreover, each entry includes a Home Agent address 904, and an optional NAI 906 for those home addresses that have been dynamically assigned, enabling a Mobile Node identified by its NAI to receive a dynamically assigned home address. In addition, each of the entries may indicate a different set of one or more ports 908 of the network device, as well as a priority 910 obtained from the registration request packet. As shown, each entry of the mobility binding table identifies a tunnel 912 via which to send packets to the IP address. It is important to note that since a set of ports may be designated in association with a particular registration, there may be more than one tunnel for a given IP address, and therefore more than one entry in the Mobility Binding Table for a given IP address. Of course, if the Home Agent stores priority information in its Mobility Binding Table, the visitor table need not store the priority information since the Home Agent will preferably prioritize the communications prior to forwarding them to the Foreign Agent.

Figure 10:
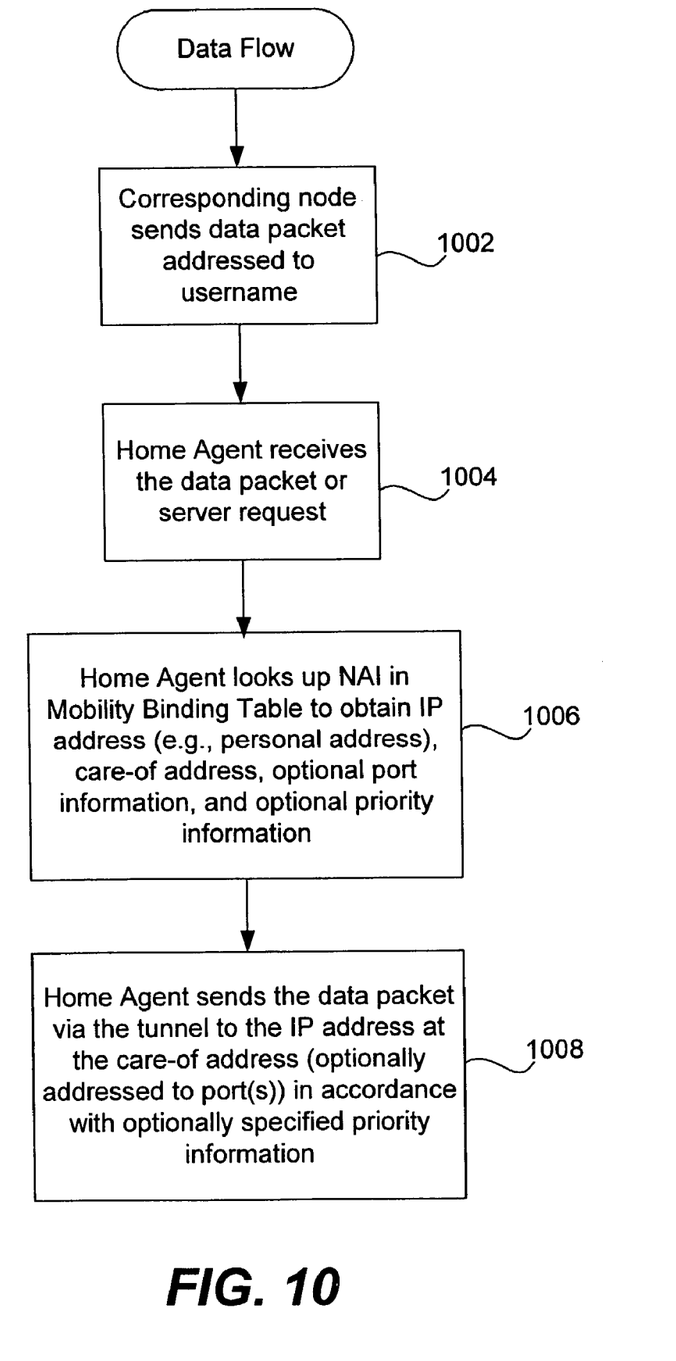
FIG. 10 is a data flow diagram illustrating a method of transmitting data packets or server requests via a Home Agent upon completion of registration in accordance with various embodiments of the invention.

FIG. 10 is a data flow diagram illustrating a method of transmitting data packets or server requests via a Home Agent upon completion of registration in accordance with various embodiments of the invention. As shown at block 1002, a Correspondent Node sends a data packet or server request to the username, which is received at block 1004 by the Home Agent. The Home Agent then performs a lookup in the Mobility Binding Table for the NAI to ascertain the IP address associated with the username and the associated care-of address from the mobility binding table at block 1006. Thus, when a user sends a data packet to a username, the Home Agent may ascertain the home address via the NAI to home address mapping in the mobility binding table. In addition, the designated ports and priority information may be identified from the mobility binding table, along with the tunnel information. The Home Agent then sends the data packet via the tunnel to the IP address at the care-of address in accordance with the port and priority information at block 1008. Specifically, the priority is a priority with which data packets or server requests addressed to the IP address (e.g., username) are to be sent to the one or more ports of the network device.

In accordance with various embodiments of the invention, multiple registrations for a particular IP address may be performed for different sets of ports, which may be overlapping or non-overlapping. Thus, when two or more different registrations for a particular IP address are used to specify different sets of ports, the priority may be used to distinguish which registration takes priority over the other(s). In this manner, different devices (e.g., laptops, cell phones, pagers) may register via different ports. Through these registrations, the port designations may be used to indicate that the device(s) support different applications (e.g., HTTP, SSL, voice) (e.g., port 80 for HTTP port). Multiple registrations may be further differentiated through the use of different priorities. Moreover, when multiple servers have registered with the Home Agent with different priorities, load balancing among the multiple servers may be performed in accordance with the respective priorities.

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, home agents, and foreign agents of this invention may be implemented in specially configured routers, switches or servers, such as specially configured router models 2600, 3200, 3600, 4500, 7200, and 7500 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 11:
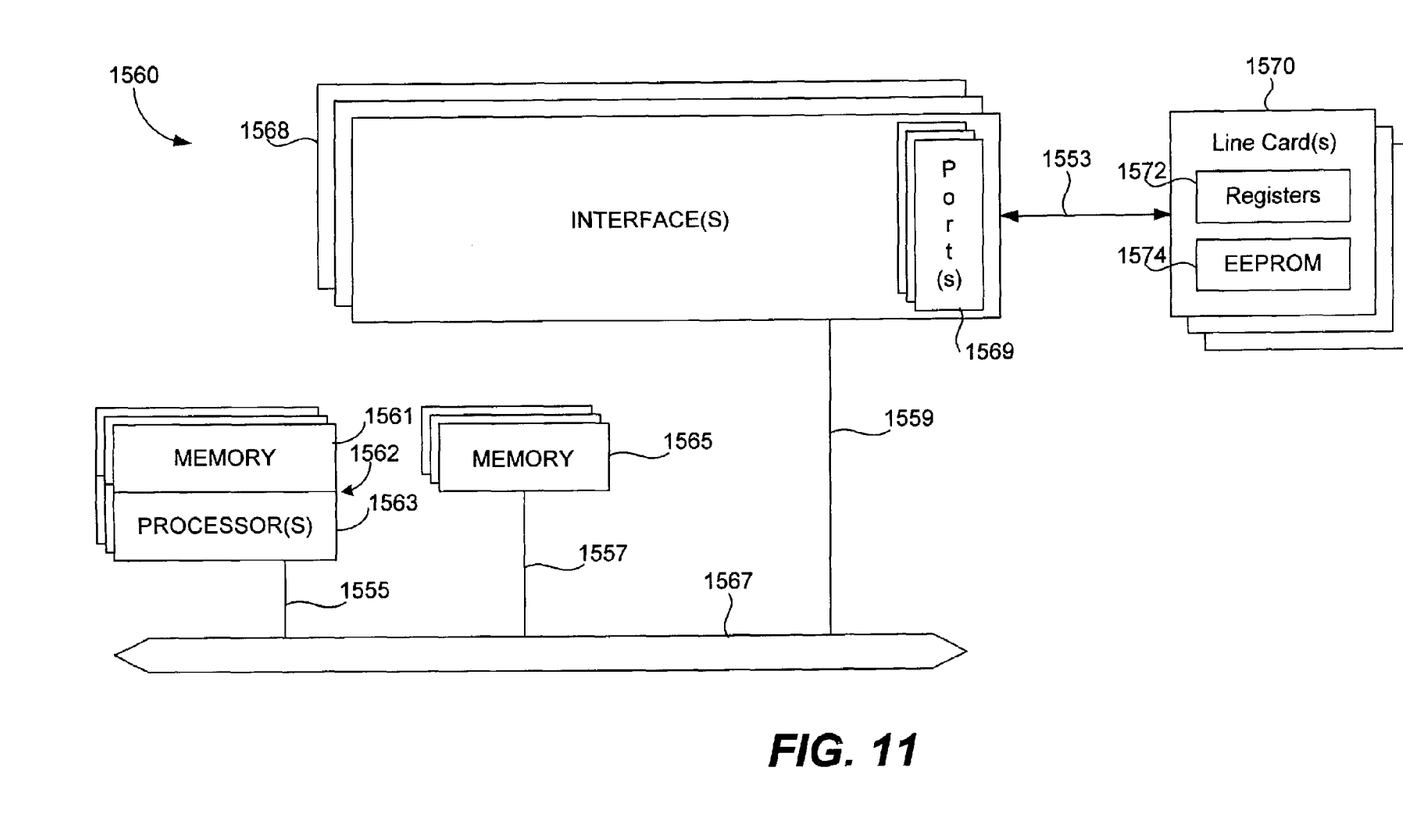
FIG. 11 is a diagram illustrating an exemplary network device in which various embodiments of the invention may be implemented.

Referring now to FIG. 11, a network device 1500 suitable for implementing the techniques of the present invention includes a master central processing unit (CPU) 1505, interfaces 1510, memory 1515 and a bus 1520. When acting under the control of appropriate software or firmware, the CPU 1505 may be responsible for implementing specific functions associated with the functions of a desired network device. For example, when configured as an intermediate router, the CPU 1505 may be responsible for analyzing packets, encapsulating packets, and forwarding packets for transmission to a set-top box. The CPU 1505 preferably accomplishes all these functions under the control of software including an operating system (e.g. Windows NT), and any appropriate applications software.

CPU 1505 may include one or more processors such as those from the Motorola family of microprocessors or the MIPS family of microprocessors. In an alternative embodiment, the processor is specially designed hardware for controlling the operations of network device 1500.

The interfaces 1510 are typically provided as interface cards (sometimes referred to as "line cards"). Generally, they control the sending and receiving of data packets over the network and sometimes support other peripherals used with the network device 1500. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the CPU 1505 to efficiently perform routing computations, network diagnostics, security functions, etc.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, the memory 1515) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being configured to comply with Mobile IP standards in force as of the time this document was written. However, it should be understood that the invention is not limited to such implementations. Accordingly, the present embodiments are to be considered as illustrative and not restrictive, and the invention is not to be limited to the details given herein, but may be modified within the scope and equivalents of the appended claims.

What is claimed is:

1. In a network device having a plurality of ports and supporting Mobile IP, a method of registering with a Home Agent, comprising:
    composing at least one Mobile IP registration request having a home address field including a home address, the Mobile IP registration request identifying two or more of the plurality of ports of the network device via which data packets or server requests addressed to the home address are to be received via a Home Agent associated with the home address, wherein the Mobile IP registration request further includes a priority associated with each of the two or more of the plurality of ports of the network device, the priority being a priority with which data packets or server requests addressed to the home address are to be sent to the two or more of the plurality of ports of the network device;
    sending the Mobile IP registration request to the Home Agent associated with the home address, thereby enabling the two or more of the plurality of ports to be registered with the Home Agent in association with the same home address; and
    receiving a Mobile IP registration reply from the Home Agent;
    wherein the Mobile IP registration reply identifies the two or more of the plurality of ports of the network device, wherein the home address is registered for each of the two or more of the plurality of ports such that multiple registrations are established for the home address, wherein a different tunnel is established between the Home Agent and each of the two or more of the plurality of ports, wherein the network device is a Mobile Node supporting Mobile IP.

2. The method as recited in claim 1, further comprising:
    appending a priority extension indicating the priority to the Mobile IP registration request.

3. The method as recited in claim 1, wherein the Mobile IP registration reply includes the priority.

4. The method as recited in claim 3, wherein the Mobile IP registration reply includes a priority extension including the priority.

5. The method as recited in claim 1, wherein an identifier of each of the plurality of ports has not been allocated to the network device by the Home Agent.

6. The method as recited in claim 1, wherein each of the two or more of the plurality of ports are configured for performing one or more of a set of applications.

7. A network device having a plurality of ports, the network device supporting Mobile IP and being adapted for registering with a Home Agent, comprising:
    a processor; and
    a memory, at least one of the processor or the memory being adapted for:
        composing a Mobile IP registration request having a home address field including a home address, the Mobile IP registration request identifying two or more of the plurality of ports of the network device via which data packets or server requests addressed to the home address are to be received via a Home Agent associated with the home address, wherein the Mobile IP registration request further includes a priority via which data packets or server requests are to be sent to the home address via the two or more of the plurality of ports;
        sending the Mobile IP registration request to the Home Agent associated with the home address, thereby enabling the two or more of the plurality of ports to be registered with the Home Agent in association with the same home address; and
        receiving a Mobile IP registration reply from the Home Agent;
        wherein the Mobile IP registration reply identifies the two or more of the plurality of ports of the network device, wherein the home address is registered for each of the two or more of the plurality of ports such that multiple registrations are established for the home address.

8. The network device as recited in claim 7, further comprising:
    appending a priority extension indicating the priority.

9. The network device as recited in claim 7, wherein the network device is a server dedicated to performing a set of applications, wherein each of the two or more of the plurality of ports are configured for performing one or more of the set of applications.

10. The network device as recited in claim 7, wherein the Mobile IP registration reply includes a port number extension identifying the two or more of the plurality of ports of the network device.

11. The network device as recited in claim 7, wherein the home address is associated with a user of the network device.

12. The network device as recited in claim 7, further comprising:
    appending a port number extension to the Mobile IP registration request, the port number extension identifying the two or more of the plurality of ports of the network device via which data packets or server requests addressed to the home address are to be received.

13. In a Home Agent, a method of processing a registration request, comprising:
    receiving at least one Mobile IP registration request from a network device having a plurality of ports, the Mobile IP registration request including a home address field identifying a home address and a care-of address, the Mobile IP registration request identifying two or more of the plurality of ports of the network device via which data packets or server requests addressed to the home address are to be received from the Home Agent,
    the Mobile IP registration request including a priority indicating a priority with which data packets or server requests are to be sent to the two or more of the plurality of ports;
    updating a mobility binding table to include two or more entries for the home address, each of the two or more entries identifying a different one of the two or more of the plurality of ports of the network device, the home address, and the care-of address such that the two or more of the plurality of ports are registered with the Home Agent in association with the same home address, wherein a different tunnel is established between the Home Agent and each of the two or more of the plurality of ports, and wherein a different tunnel is established in association with each of the two or more entries; and
    sending a Mobile IP registration reply to the network device;
    wherein the Mobile IP registration reply identifies the two or more of the plurality of ports of the network device, wherein the home address is registered for each of the two or more of the plurality of ports such that multiple registrations are established for the home address, wherein the network device is a Mobile Node supporting Mobile IP.

14. The method as recited in claim 13, wherein an identifier of each of the plurality of ports has not been allocated to the network device by the Home Agent.

15. A Home Agent adapted for processing a registration request, comprising:
   a processor; and
   a memory, at least one of the processor or the memory being adapted for:
      receiving a Mobile IP registration request from a network device having a plurality of ports, the Mobile IP registration request including a home address field identifying a home address and a care-of address, the Mobile IP registration request identifying two or more of the plurality of ports of the network device via which data packets or server requests addressed to the home address are to be received via the Home Agent, the Mobile IP registration request further including a priority indicating a priority with which data packets or server requests are to be sent to the two or more of the plurality of ports;
      updating a mobility binding table to include two or more entries for the home address, each of the two or more entries identifying a different one of the two or more of the plurality of ports of the network device, the home address, and the care-of address such that the two or more of the plurality of ports are registered with the Home Agent in association with the same home address; and
      sending a Mobile IP registration reply to the network device;
      wherein the Mobile IP registration reply identifies the two or more of the plurality of ports of the network device, wherein the home address is registered for each of the two or more of the plurality of ports such that multiple registrations are established for the home address, wherein a different tunnel is established between the Home Agent and each of the two or more of the plurality of ports, wherein the network device is a Mobile Node supporting Mobile IP.

16. Home Agent as recited in claim 15, the Mobile IP registration request including a priority extension indicating the priority.

17. The Home Agent as recited in claim 15, wherein the Mobile IP registration reply includes the priority.

18. The Home Agent as recited in claim 17, wherein the Mobile IP registration reply includes a priority extension indicating the priority.

19. The Home Agent as recited in claim 15, at least one of the processor or the memory being further adapted for:
   storing the priority in the two or more entries of the mobility binding table.

20. The Home Agent as recited in claim 19, at least one of the processor or the memory being further adapted for:
   receiving a data packet or server request addressed to the home address;
   determining the priority associated with the home address from the mobility binding table; and
   forwarding the data packet or server request to at least one of the two or more of the plurality of ports of the network device according to the priority.

21. The Home Agent as recited in claim 15, wherein the Mobile IP registration request identifies two or more of the plurality of ports, wherein the two or more entries of the mobility binding table identify a tunnel via which to send packets to the home address for each of the two or more of the plurality of ports such that the home address is registered with the Home Agent for each of the two or more of the plurality of ports.

22. The Home Agent as recited in claim 21, wherein the home address is associated with a user of the network device.

23. The Home Agent as recited in claim 21, the Mobile IP registration request having a port extension identifying the two or more of the plurality of ports.

24. The Home Agent as recited in claim 15, wherein the mobility binding table includes a plurality of entries associated with the home address, each of the entries identifying a different one of the two or more of the plurality of ports of the network device such that each of the plurality of entries represents a different registration of the home address with the Home Agent.

25. The Home Agent as recited in claim 24, at least one of the processor or the memory being further adapted for:
   repeating the receiving, updating and sending steps for a Mobile IP registration request identifying a second set of two or more of the plurality of ports of the network device.

26. The Home Agent as recited in claim 15, at least one of the processor or the memory being further adapted for:
   receiving a data packet or server request addressed to the home address; and
   forwarding the data packet or server request to at least one of the two or more of the plurality of ports of the network device.

27. In a Foreign Agent, a method of processing a registration request, comprising:
   receiving at least one Mobile IP registration request from a network device having a plurality of ports, the Mobile IP registration request including a home address field identifying a home address, the Mobile IP registration request identifying two or more of the plurality of ports of the network device via which data packets or server requests addressed to the home address are to be received from a Home Agent associated with the home address, the Mobile IP registration request including a priority indicating a priority with which data packets or server requests are to be sent to the two or more of the plurality of ports;
   forwarding the Mobile IP registration request to a Home Agent address identifying the Home Agent associated with the home address, thereby enabling the two or more of the plurality of ports to be registered with the Home Agent in association with the same home address;
   receiving a Mobile IP registration reply from the Home Agent;
   updating a visitor table to include at least one entry for the home address, the at least one entry identifying the two or more of the plurality of ports of the network device, the home address, and the Home Agent address; and
   forwarding the Mobile IP registration reply to the network device, wherein the network device is a Mobile Node supporting Mobile IP.

28. A Foreign Agent adapted for processing a registration request, comprising:
   a processor; and
   a memory, at least one of the processor or the memory being adapted for:
      receiving a Mobile IP registration request from a network device having a plurality of ports, the Mobile IP registration request including a home address field identifying a home address, the Mobile IP registration request identifying two or more of the plurality of ports of the network device via which data packets or server requests addressed to the home address are to be received via a Home Agent associated with the home address, the Mobile IP registration request including a priority indicating a priority with which data packets or server requests are to be sent to the two or more of the plurality of ports;

forwarding the Mobile IP registration request to a Home Agent address identifying the Home Agent associated with the home address, thereby enabling the two or more of the plurality of ports to be registered with the Home Agent in association with the same home address;

receiving a Mobile IP registration reply from the Home Agent;

updating a visitor table to include at least one entry for the home address, the at least one entry identifying the two or more of the plurality of ports of the network device, the home address, and the Home Agent address; and forwarding the Mobile IP registration reply to the network device, wherein the network device is a Mobile Node supporting Mobile IP.

29. Foreign Agent as recited in claim 28, the Mobile IP registration request including a priority extension indicating the priority.

30. The Foreign Agent as recited in claim 28, wherein the Mobile IP registration reply includes the priority.

31. The Foreign Agent as recited in claim 30, wherein the Mobile IP registration reply includes a priority extension indicating the priority.

32. The Foreign Agent as recited in claim 28, at least one of the processor or the memory being adapted for:

storing the priority in the at least one entry of the visitor table.

33. The Foreign Agent as recited in claim 28, wherein the at least one entry of the visitor table identifies a different tunnel via which to send packets to the home address for each of two or more of the plurality of ports, the two or more of the plurality of ports being identified in the registration request.

34. The Foreign Agent as recited in claim 33, the Mobile IP registration request having a port extension identifying the two or more of the plurality of ports.

35. The Foreign Agent as recited in claim 28, wherein the home address is associated with a user of the network device.

36. The Foreign Agent as recited in claim 28, wherein the visitor table includes a plurality of entries associated with the home address, each of the entries identifying a different set of two or more of the plurality of ports such that each of the plurality of entries represents a different registration of the home address with the Home Agent.

37. A computer-readable storage medium storing thereon computer-readable instructions for registering a network device supporting Mobile IP with a Home Agent, the network device having a plurality of ports, comprising:

instructions for composing a Mobile IP registration request having a home address field including a home address, the Mobile IP registration request identifying two or more of the plurality of ports of the network device via which data packets or server requests addressed to the home address are to be received from a Home Agent associated with the home address, wherein the Mobile IP registration request further includes a priority associated with each of the two or more of the plurality of ports of the network device, the priority being a priority with which data packets or server requests addressed to the home address are to be sent to the two or more of the plurality of ports of the network device;

instructions for sending the Mobile IP registration request to the Home Agent associated with the home address, thereby enabling the two or more of the plurality of ports to be registered with the Home Agent in association with the same home address; and instructions for processing a Mobile IP registration reply received from the Home Agent;

wherein the Mobile IP registration reply identifies the two or more of the plurality of ports of the network device, wherein the home address is registered for each of the two or more of the plurality of ports such that multiple registrations are established for the home address, wherein the network device is a Mobile Node supporting Mobile IP.

38. A network device having a plurality of ports, the network device supporting Mobile IP and being adapted for registering with a Home Agent, comprising:

means for composing by a processor a Mobile IP registration request having a home address field including a home address, the Mobile IP registration request identifying two or more of the plurality of ports of the network device via which data packets or server requests addressed to the home address are to be received from a Home Agent associated with the home address, wherein the Mobile IP registration request further includes a priority associated with each of the two or more of the plurality of ports of the network device, the priority being a priority with which data packets or server requests addressed to the home address are to be sent to the two or more of the plurality of ports of the network device;

means for sending by a processor the Mobile IP registration request to the Home Agent associated with the home address, thereby enabling the two or more of the plurality of ports to be registered with the Home Agent in association with the same home address; and means for receiving by a processor a Mobile IP registration reply from the Home Agent;

wherein the Mobile IP registration reply identifies the two or more of the plurality of ports of the network device, wherein the home address is registered for each of the two or more of the plurality of ports such that multiple registrations are established for the home address.

39. A computer-readable storage medium storing thereon computer-readable instructions for processing a registration request in a Home Agent, comprising:

instructions for processing a Mobile IP registration request received from a network device having a plurality of ports, the Mobile IP registration request including a home address field identifying a home address and a care-of address, the Mobile IP registration request identifying two or more of the plurality of ports of the network device via which data packets or server requests addressed to the home address are to be received from the Home Agent, the Mobile IP registration request including a priority indicating a priority with which data packets or server requests are to be sent to the two or more of the plurality of ports;

instructions for updating a mobility binding table to include two or more entries for the home address, each of the two or more entries identifying a different one of the two or more of the plurality of ports of the network device, the home-address, and the care-of address such that the two or more of the plurality of ports are registered with the Home Agent in association with the same home address, and wherein a different tunnel is established in association with each of the two or more entries such that a different tunnel is established between the Home Agent and each of the two or more of the plurality of ports; and instructions for sending a Mobile IP registration reply to the network device;

wherein the Mobile IP registration reply identifies the two or more of the plurality of ports of the network device, wherein the home address is registered for each of the two or more of the plurality of ports such that multiple registrations are established for the home address, wherein a different tunnel is established between the Home Agent and each of the two or more of the plurality of ports, and wherein the network device is a Mobile Node supporting Mobile IP.

40. A Home Agent adapted for processing a registration request, comprising:

means for receiving by a processor a Mobile IP registration request from a network device having a plurality of ports, the Mobile IP registration request including a home address field identifying a home address and a care-of address, the Mobile IP registration request identifying two or more of the plurality of ports of the network device via which data packets or server requests addressed to the home address are to be received by the network device from the Home Agent, the Mobile IP registration request including a priority indicating a priority with which data packets or server requests are to be sent to the two or more of the plurality of ports;

means for updating by a processor a mobility binding table to include two or more entries for the home address, the two or more entries identifying a different one of the two or more of the plurality of ports of the network device, the home address, and the care-of address such that the two or more of the plurality of ports are registered with the Home Agent in association with the same home address; and means for sending by a processor a Mobile IP registration reply to the network device;

wherein the Mobile IP registration reply identifies the two or more of the plurality of ports of the network device, wherein the home address is registered for each of the two or more of the plurality of ports such that multiple registrations are established for the home address, wherein a different tunnel is established between the Home Agent and each of the two or more of the plurality of ports, and wherein the network device is a Mobile Node supporting Mobile IP.

41. A computer-readable storage medium storing thereon computer-readable instructions for processing a registration request in a Foreign Agent, comprising:

instructions for forwarding a Mobile IP registration request identifying a home address and received from a network device to a Home Agent associated with the home address, the Mobile IP registration request identifying two or more of the plurality of ports of the network device via which data packets or server requests addressed to the home address are to be received from the Home Agent, the Mobile IP registration request further including a priority indicating a priority with which data packets or server requests are to be sent to the two or more of the plurality of ports thereby enabling the two or more of the plurality of ports to be registered with the Home Agent in association with the same home address;

instructions for updating a visitor table to include at least one entry for the home address, the at least one entry identifying the two or more of the plurality of ports of the network device, the home address, and the Home Agent address when a Mobile IP registration reply is received from the Home Agent; and instructions for forwarding the Mobile IP registration reply to the network device, wherein the network device is a Mobile Node supporting Mobile IP.

42. A Foreign Agent adapted for processing a registration request, comprising:

means for receiving by a processor a Mobile IP registration request from a network device having a plurality of ports, the Mobile IP registration request including a home address field identifying a home address, the Mobile IP registration request identifying two or more of the plurality of ports of the network device via which data packets or server requests addressed to the home address are to be received via a Home Agent associated with the home address, the Mobile IP registration request including a priority indicating a priority with which data packets or server requests are to be sent to the two or more of the plurality of ports;

means for forwarding by a processor the Mobile IP registration request to a Home Agent address identifying the Home Agent associated with the home address, thereby enabling the two or more of the plurality of ports to be registered with the Home Agent in association with the same home address;

means for receiving by a processor a Mobile IP registration reply from the Home Agent;

means for updating by a processor a visitor table to include at least one entry for the home address, the at least one entry identifying the two or more of the plurality of ports of the network device, the home address, and the Home Agent address; and means for forwarding by a processor the Mobile IP registration reply to the network device, wherein the network device is a Mobile Node supporting Mobile IP.

* * * * *